(12) United States Patent
Matsuda et al.

(10) Patent No.: US 8,286,005 B2
(45) Date of Patent: Oct. 9, 2012

(54) CONFIDENTIAL INFORMATION MEMORY APPARATUS, ERASING METHOD OF CONFIDENTIAL INFORMATION, AND ERASING PROGRAM OF CONFIDENTIAL INFORMATION

(75) Inventors: Nori Matsuda, Tokyo (JP); Mitsuhiro Hattori, Tokyo (JP); Takeshi Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 12/532,492

(22) PCT Filed: Mar. 27, 2007

(86) PCT No.: PCT/JP2007/056482
§ 371 (c)(1),
(2), (4) Date: Sep. 22, 2009

(87) PCT Pub. No.: WO2008/117467
PCT Pub. Date: Oct. 2, 2008

(65) Prior Publication Data
US 2010/0058077 A1 Mar. 4, 2010

(51) Int. Cl.
*G06F 21/00* (2006.01)
(52) U.S. Cl. .................................................. 713/194
(58) Field of Classification Search ............... 713/194
See application file for complete search history.

(56) References Cited

U.S. PATENT DOCUMENTS

| 5,948,102 A | 9/1999 | Wuidart |
| 7,039,815 B1 | 5/2006 | Grassl et al. |
| 7,124,170 B1 * | 10/2006 | Sibert ............................ 709/216 |
| 7,205,883 B2 * | 4/2007 | Bailey ............................ 340/5.3 |
| 2003/0084285 A1 * | 5/2003 | Cromer et al. ................. 713/164 |
| 2005/0039040 A1 | 2/2005 | Ransom et al. |
| 2007/0124409 A1 | 5/2007 | Sibert |
| 2009/0055612 A1 | 2/2009 | Sibert |
| 2011/0173409 A1 | 7/2011 | Sibert |

FOREIGN PATENT DOCUMENTS

EP 0 965 902 12/1999

(Continued)

OTHER PUBLICATIONS

Japanese Office Action issued Jul. 26, 2011, in Patent Application No. 2009-506179 (with Partial English-langauge translation).
U.S. Appl. No. 12/920,606, filed Sep. 2, 2010, Matsuda, et al.
Extended European Search Report issued Nov. 30, 2011 in patent application No. 07739920.2.

(Continued)

*Primary Examiner* — Michael S McNally
(74) *Attorney, Agent, or Firm* — Oblon, Spivak, McClelland, Maier & Neustadt, L.L.P.

(57) ABSTRACT

A tamper resistant apparatus 101 is mounted inside of a PC 900 and stores confidential information A through C. The tamper resistant apparatus 101 receives data from an application 118 which operates on the PC 900, processes the data using the confidential information A through C, and returns processed data to the application 118. To the tamper resistant apparatus 101, plural external sensors 110 provided to the PC 900 are connected. The plural external sensors 110 detect opening/closing of a case of the PC 900 or movement of the body of the PC 900 and send a detection signal to the tamper resistant apparatus 101. On inputting the detection signal from the plural external sensors 110, the tamper resistant apparatus 101 selects and erases confidential information to be erased from the confidential information A through C according to the tamper resistant policy stored previously.

8 Claims, 8 Drawing Sheets

FOREIGN PATENT DOCUMENTS

| | | |
|---|---|---|
| EP | 1 089 219 | 4/2001 |
| JP | 2001 273468 | 10/2001 |
| JP | 2002 216099 | 8/2002 |
| JP | 2006-155159 | 6/2006 |
| JP | 2006 155159 | 6/2006 |
| JP | 2006 180244 | 7/2006 |
| JP | 2006 190222 | 7/2006 |
| JP | 2006 229667 | 8/2006 |

OTHER PUBLICATIONS

Smith, S. W. et al., "Building a High-Performance, Programmable Secure Coprocessor", Computer Networks, vol. 31, pp. 831-860 (1999).

Chinese Office Action issued Dec. 2, 2010, in Patent Application No. 200780052102.6 (with partial English-language translation).

* cited by examiner

CONFIDENTIAL INFORMATION MEMORY APPARATUS, ERASING METHOD OF CONFIDENTIAL INFORMATION, AND ERASING PROGRAM OF CONFIDENTIAL INFORMATION

TECHNICAL FIELD

The present invention relates to a tamper resistant apparatus that detects tampering and automatically erases confidential information stored therein, an erasing method of confidential information, and an erasing program of confidential information.

BACKGROUND ART

In apparatuses handling confidential information of which risk of leakage is extremely high such as an encryption apparatus for administrating a private key used for encryption, etc., there exists a risk of confidential information stolen by analyzing the operation of CPU (Central Processing Unit) and memories embedded in the apparatus using a logic analyzer, etc. Therefore, measure has been taken to secure safety of the whole apparatus using tamper resistant technique by wrapping the whole apparatus with a metal cover and automatically erasing the confidential information on detecting the fact that the cover is removed.

A conventional tamper resistant apparatus includes a magnetic flux generating device in a cover of the apparatus and a magnetic flux detecting device is connected on the board. Opening the cover changes relative position of the magnetic flux generating device and the magnetic flux detecting device, which enables the magnetic flux detecting device to detect the change of the magnetic flux. Therefore, the tamper resistant apparatus, on detecting the change of the magnetic flux, carries out a tamper resistant process such as erasing the confidential information stored in a volatile memory by suspending the power supply to the volatile memory (Patent Document 1, for example).

Further, there sometimes exist not only one but plural pieces of confidential information. In such a case, another method is proposed to prevent leakage of key information by detecting removal of a cover that wraps the apparatus and erasing all of the plural pieces of confidential information stored in a memory device (Patent Document, for example).
Patent document 1: JP2006-229667A pp. 3-4, FIG. 3
Patent document 2: JP2006-190222A pp. 5-7, FIG. 1

DISCLOSURE OF THE INVENTION

Problems to be Solved by the Invention

The conventional tamper resistant apparatus has a problem that the apparatus cannot be involved in whether generated data is protected or not when data generated inside of the apparatus itself based on the confidential information stored inside of the apparatus itself is sent to a PC (Personal Computer; PC, hereinafter), etc. connected to the apparatus itself.

For example, it is assumed that encrypted movie or music is purchased, encrypted contents of the movie or music is decrypted using a secret key stored in the tamper resistant encryption apparatus which is one of implementation embodiments of the tamper resistant apparatus, and played on a PC to which a monitor is connected. In this case, although the tamper resistant apparatus can protect the secret key for decrypting the encrypted contents, the decrypted contents of movie or music is sent to the PC which is located outside of the tamper resistant apparatus. However, the PC itself does not have a tamper resistant mechanism. Further, the tamper resistant encryption apparatus cannot know whether the PC is analyzed or not using a debugger, a logic analyzer, etc. Therefore, the tamper resistant encryption apparatus cannot be involved in whether the contents sent to the PC is properly protected or not.

Further, the conventional tamper resistant apparatus is configured to include a plurality of sensors such as a switch, an optical sensor, a magnetic sensor, a temperature sensor, vibration sensor, etc. Therefore, only detection of tampering by one of the sensors causes complete erasure of the confidential information in the tamper resistant apparatus, and thus there is a problem that the recovery process thereafter becomes complex.

For example, in the tamper resistant encryption apparatus shown in the above example, it is assumed that a secret key for decrypting the contents and an authentication key for remote maintenance are stored. The authentication key is used for establishing an encrypted communication channel such as SSL for maintenance of the tamper resistant encryption apparatus by the contents distribution center. Therefore, it is considered that the authentication key which is not directly used to protect the contents has low degree of protection compared with the encryption key used for protecting the contents. Further, since the temperature sensor or the vibration sensor is a sensor which detects a change of environment under which the tamper resistant encryption apparatus is provided, the risk of leakage of the confidential information is considered to be low compared with the optical sensor or the magnetic sensor which detect the removal of the cover, etc. In this case, if the authentication key is not erased even when the temperature sensor or the vibration sensor works, but only the secret key can be erased, it is possible to easily carry out the recovery process after detection of tampering (maintenance) while the risk of leakage of the contents can be suppressed. However, a conventional tamper resistant encryption board cannot partially erase confidential information according to the reason of detection of tampering or the attribute or the degree of importance of the confidential information.

(1) The present invention aims to prevent leakage of confidential information in the tamper resistant apparatus or data sent to the outside apparatus for not only the tamper resistant apparatus itself but also the outside apparatus such as PC to which the tamper resistant apparatus itself is connected by detecting tampering activity such as removal of the cover, etc. and performing tamper process with the tamper resistant apparatus.

(2) Further, at the time of detecting tampering, it is an object to prevent the decrease of the usability as well as preventing the leakage of the confidential information by enabling to partially or selectively erase the confidential information with consideration of a type of tampering or the degree of importance of the confidential information according to the security policy specified by the user with consideration of the type of tampering or the degree of importance of the confidential information.

Means to Solve the Problems

According to the present invention, a confidential information memory apparatus includes:
a sensor related record memory unit for storing at least one sensor related record in which at least one sensor is made related to predetermined confidential information and detecting condition to be satisfied by the sensor related is specified;

a confidential information memory unit for storing at least one piece of confidential information; and a confidential information erasing unit for inputting a detection signal from the sensor shown by the sensor related record stored in the sensor related record memory unit, extracting the sensor related record which satisfies all of the detecting conditions based on the detection signal inputted, and erasing confidential information shown by the sensor related record extracted from the confidential information memory unit.

The confidential information memory unit stores a plurality of pieces of confidential information.

The sensor related record memory unit stores a plurality of sensor related records.

The sensor related record includes a sending instruction to instruct whether a tamper detecting notice to notify detection of tampering should be sent or not and a sending destination address showing a sending destination of the tamper detecting notice; and the confidential information erasing unit, when the sensor related record which satisfies all of the detecting conditions is extracted based on the detection signal inputted, confirms the sending instruction shown by the sensor related record extracted, and if the sending instruction instructs sending, sends the tamper detecting notice to the sending destination address.

The sensor related record further includes an erasing instruction to instruct whether confidential information shown by the sensor related record itself is erased or not; and the confidential information erasing unit, when the sensor related record which satisfies all of the detecting conditions is extracted based on the detection signal inputted, erases the confidential information shown by the sensor related record extracted from the confidential information memory unit only if the erasing instruction shown by the sensor related record extracted instructs erasing of confidential information.

The confidential information erasing unit observes a detection signal which triggered sending of a tamper detecting notice, and as a result of observation, if all of the detection signals do not satisfy corresponding detecting conditions, sends a tamper-recovery notice to notify that an attack has ceased to the sending destination to which the tamper detecting notice has been sent.

The confidential information memory apparatus further includes a sensor related record setting unit for inputting at least either of a new sensor related record and correction data to be used for correcting the sensor related record stored in the sensor related record memory unit as input data, and setting the input data inputted in the sensor related record memory unit.

The confidential information memory apparatus is packed with a package; and the sensor by which the confidential information erasing unit inputs the detection signal is at least either of an external sensor provided outside of the package and an internal sensor provided inside of the package.

According to the present invention, an erasing method of confidential information carried out by a confidential information memory apparatus storing confidential information, the method includes:

by a sensor related record memory unit, storing at least one sensor related record in which at least one sensor is made related to predetermined confidential information and detecting condition to be satisfied by the sensor related is specified;

by a confidential information memory unit, storing at least one piece of confidential information; and by a confidential information erasing unit, inputting a detection signal from the sensor shown by the sensor related record stored in the sensor related record memory unit, extracting the sensor related record which satisfies all of the detecting conditions based on the detection signal inputted, and erasing confidential information shown by the sensor related record extracted from the confidential information memory unit.

According to the present invention, an erasing program of confidential information has a confidential information memory apparatus being a computer including a confidential information memory unit and a sensor related record memory unit perform following processes:

(1) a process for storing at least one sensor related record in which at least one sensor is made related to predetermined confidential information and detecting condition to be satisfied by the sensor related is specified in the sensor related record memory unit;

(2) a process for storing at least one piece of confidential information in a confidential information memory unit; and (3) a process for inputting a detection signal from the sensor shown by the sensor related record stored in the sensor related record memory unit, extracting the sensor related record which satisfies all of the detecting conditions based on the detection signal inputted, and erasing confidential information shown by the sensor related record extracted from the confidential information memory unit.

According to the present invention, a confidential information memory apparatus packed by a package includes:

a confidential information memory unit for storing confidential information; and a confidential information erasing unit connected to an external sensor provided at a predetermined location which is outside of the package, and when a detection signal detected by the external sensor is inputted from the external sensor, for erasing the confidential information stored in the confidential information memory unit.

Effect of the Invention

The present invention is able to provide a tamper resistant apparatus which detects tampering of not only the tamper resistant apparatus itself but also the outside device such as the PC to which the tamper resistant apparatus is connected. Further, it is possible to provide a tamper resistant apparatus which can selectively erase the confidential information at the time of detecting tampering.

Preferred Embodiments for Carrying Out the Invention

Embodiment 1

FIG. 1 shows an example of use status of a tamper resistant apparatus 101 according to the first embodiment.

(1) The tamper resistant apparatus 101 is mounted, for example, inside of a PC 900. The tamper resistant apparatus 101 includes confidential information A through C. The tamper resistant apparatus 101 receives data from an application 118 which operates on the PC 900, processes the data using confidential information A through C stored therein, and sends processed data back to the application 118.

(2) Further, plural external sensors 110 provided to the PC 900 are connected to the tamper resistant apparatus 101. The plural external sensors 110 detect opening/closing of a case of the PC 900 and movement of a main body of the PC 900 (in case of GPS (Global Positioning System) sensor), and sends a detection signal to the tamper resistant apparatus 101.

(3) Inputting the detection signal from the plural external sensors 110, the tamper resistant apparatus 101 selects and erases confidential information that should be erased among the confidential information A through C according to an erasing rule (a tamper resistant policy which will be discussed below) which has been stored previously. Characteristic points are that the tamper resistant apparatus 101 detects an attack to the PC 900 by the external sensor 110 and erases confidential information and that the tamper resistant apparatus 101 selectively erases the confidential information.

FIG. 2 shows an example of hardware resource of the tamper resistant apparatus 101 according to the first embodiment. The tamper resistant apparatus 101 includes a CPU (Central Processing Unit) 103 executing programs. The CPU 103 is connected via a bus 825 to a ROM (Read Only Memory) 811, a RAM (Random Access Memory) 812, a communication IF (InterFace) 816, and a flash memory 820, and controls these hardware devices. Instead of the flash memory 820, a magnetic disk drive can be used.

The RAM 812 is an example of volatile memories. Storage medium such as the flash memory 820, etc. is an example of nonvolatile memories. These are examples of a memory device, a memory unit, and a storing unit. The communication IF 816 is an example of an inputting unit and an inputting device. The communication IF 816 is also an example of an outputting unit and an outputting device. The communication IF 816 is a device to intervene in exchange of data between the CPU 103 and applications of the PC 900.

The flash memory 820 stores an operating system 821 (OS), a group of programs 823, and a group of files 824. Programs of the group of programs 823 are executed by the CPU 103 and the operating system 821.

The above group of programs 823 store programs to perform functions which will be explained as "—unit" in the explanation of the following embodiment. The programs are read and executed by the CPU 103.

The group of files 824 store information which will be explained as "determined result of —", "extracted result of —", "generated result of —", and "processed result of —" in the explanation of the following embodiment, "tamper resistant policy 105" which will be discussed later, and data, signal values, variable values, or parameters, etc. as respective items of "— file" and "— database".

Further, "— unit" which will be explained in the explanation of the following embodiment can be "— circuit", "— device", "— equipment", and "— means", and also "— step", "— procedure", and "— process". Namely, "— unit" which will be explained can be implemented by firmware stored in the ROM 811. Or it can be implemented by only software, only hardware such as element/device/board/wiring, etc., a combination of software and hardware, or a combination further with firmware. Programs are read by the CPU 103 and executed by the CPU 103. Namely, the programs are to function a computer as "— unit" which will be discussed below. Or the programs are to have the computer execute a procedure and a method of "— unit" which will be discussed below.

FIG. 3 is a block diagram showing a configuration of the tamper resistant apparatus 101. As shown in FIG. 3, the tamper resistant apparatus 101 (confidential information memory apparatus) includes a cover 102 (package), a CPU 103, a policy memory unit 106 (sensor related record memory unit), a data memory unit 107, plural internal sensors 109, a power source controlling unit 113, a buttery 114, and a confidential information erasing unit 120.

(1) The CPU 103 includes a data processing unit 117 and a policy setting unit 104.
(2) The policy memory unit 106 stores a tamper resistant policy 105.
(3) The data memory unit 107 stores confidential information A, confidential information B, and confidential information C which are confidential information 108.
(4) A confidential information erasing unit 120 includes a tamper detecting unit 111, a data erasing unit 112, and a tamper notifying unit 116.

Further, an application program 118 (application, hereinafter) is connected to the CPU 103. Further, plural external sensors 110 are connected to the tamper detecting unit 111. Further, an external power source 115 is connected to the power source controlling unit 113.

(the CPU 103, the Data Processing Unit 117, and the Policy Setting Unit 104)

As explained above, the CPU 103 includes the data processing unit 117 and the policy setting unit 104. The data processing unit 117 implements various functions in the tamper resistant apparatus 101. The data processing unit 117 executes, for example in case of a tamper resistant encryption apparatus, programs performing encrypting process or decrypting process. The data processing unit 117 processes data of the application 118 and returns the processed data to the application 118. Further, the policy setting unit 104 sets what kind of tamper detecting process to be carried out when tampering is detected in the tamper resistant policy 105 of the policy memory unit 106.

(the Tamper Resistant Policy 105, the Policy Memory Unit 106, the Data Memory Unit 107, and the Confidential Information 108)

(1) The data memory unit 107 stores the confidential information 108 which is requested to save in the tamper resistant apparatus 101. In general, plural pieces of the confidential information 108 are stored according to the purpose of use. FIG. 3 shows status in which three pieces of the confidential information A, the confidential information B, and the confidential information C are stored. In the following explanation, it is assumed that volatile memory is used as the data memory unit 107 for storing the confidential information 108.

(2) The policy memory unit 106 stores the tamper resistant policy 105. "The tamper resistant policy 105" is a policy which describes how the tamper resistant apparatus 101 operates when the tamper detecting unit 111 detects a tampering. In the following explanation, it is assumed that the policy memory unit 106 is nonvolatile memory.

(the Cover 102, the Internal Sensor 109, and the External Sensor 110)

(1) The cover 102 (package) covers a whole or a part of the tamper resistant apparatus 101 in order to make it difficult to attack on the CPU 103, memories, and other IC (Integrated Circuit) embedded in the tamper resistant apparatus 101, and wiring for connecting them by hardware analysis with a logic analyzer or a debugger and by induction of malfunction with electromagnetic wave or X-ray and so on. Further, a broken line in FIG. 3 shows an area to be sealed by the cover 102. The buttery 114 may need to be exchanged and thus is not sealed by the cover 102. In general, a metal cover, a mold by epoxy resin, etc. are used for the cover 102.

(2) FIG. 3 shows the plural internal sensors 109. The internal sensor 109 is a sensor provided inside of the cover 102 and a sensor for detecting an attack on the tamper resistant apparatus 101. The internal sensor 109 includes, for example, a switch detecting removal of the cover 102 or an optical sensor detecting cutout of the tamper resistant apparatus 101, a gyro sensor detecting an impact at the tamper resistant apparatus 101, etc. Generally, plural sensors are connected; however, it is sometimes omitted in the first embodiment if the external sensor 110 is provided.

(3) The external sensor 110 is a sensor provided outside of the cover 102 of the tamper resistant apparatus 101 and separately connected to the tamper resistant apparatus 101 in order to detect change of the environment in which the tamper resistant apparatus 101 is provided. The external sensor 110 includes, for example, an optical sensor for detecting opening/closing of the cover (housing) of the PC 900, to which the temper resistant apparatus 101 is connected, a GPS sensor for detecting a fact that the PC 900 is carried away, etc. As the external sensor 110, appropriate sensor is connected separately for each purpose of use according to the use status of the tamper resistant apparatus 101 and a kind of expecting attack.

(the Tamper Detecting Unit 111, the Data Erasing Unit 112, the Power Source Controlling Unit 113, the Buttery 114, the External Power Source 115, and the Tamper Notifying Unit 116)

(1) By observing the status of the internal sensor 109 and the external sensor 110, the tamper detecting unit 111 detects an attack on the tamper resistant apparatus 101, a recovery from the attack, a change of the environment in which the tamper resistant apparatus 101 is provided and so on. The tamper detecting unit 111 issues an instruction of a tamper process or a tamper recovery process to the data erasing unit 112, the power source controlling unit 113, and the tamper notifying unit 116 based on the tamper resistant policy 105 stored in the policy memory unit 106.

(2) The data erasing unit 112 erases or initializes all of the confidential information 108 or a part of the confidential information 108 (only the confidential information A, only the confidential information A and the confidential information B, for example) stored in the data memory unit 107 according to the instruction from the tamper detecting unit 111.

(3) The tamper notifying unit 116 sends "tamper detection notice" showing detection of the tampering or "tamper recovery notice" showing recovery from the tampered status to the data processing unit 117 which is the program to be operated on the CPU 103 or the application 118 which uses the tamper resistant apparatus 101 according to the instruction from the tamper detecting unit 111.

(4) The buttery 114 and the external power source 115 supply electric power to the data memory unit 107 which is a volatile memory. In general, the external power source 115 is also power source for operating the CPU 103, etc. in the tamper resistant apparatus 101. The buttery 114 supplies electric power in a limited way to the tamper detecting unit 111, the data erasing unit 112, the power source controlling unit 113, the data memory unit 107, etc. in order to enable to detect tampering even if the external power source 115 does not work.

(5) The power source controlling unit 113 supplies electric power supplied from the buttery 114 connected to the tamper resistant apparatus 101 and the external power source 115 to the data memory unit 107, and as well switches on/off of electric power supply to the data memory unit 107 according to the instruction of the tamper detecting unit 111.

(the Application 118)

The application 118 is a program, etc to be operated on the PC to which the tamper resistant apparatus 101 is connected. The application 118 is a function prepared separately to use the tamper resistant apparatus 101. The application 118 requests the data processing unit 117 to process data and receives the processed result. Or the application 118 asks the policy setting unit 104 to set or correct the tamper resistant policy 105. Or the application 118 includes a function to receive "tamper detection notice" and "tamper recovery notice" from the tamper notifying unit 116.

FIG. 4 shows a data format of confidential information. Confidential information 701 shown in FIG. 4 includes a unique ID 702, a data type 703, generator information 704, a body of confidential information 705, purpose of use information 706, user information 707, an identification label 708, and a valid period 709. These items are specified in an erasing condition record 202n of a tamper resistant policy record 213 shown in FIG. 5.

FIG. 5 shows a configuration of the tamper resistant policy 105. The tamper resistant policy 105 is a policy (rule) showing what kind of tamper detecting process to be carried out when tampering is detected. The configuration of the tamper resistant policy 105 will be explained with reference to FIG. 5.

The tamper resistant policy 105 is a table having three columns of a tamper detecting condition 201, an erasing condition 202, and a notifying condition 203.

(1) The tamper detecting condition 201 (detecting condition) shows condition of a measured value of each sensor based on which it is determined that a tampering is detected.

(2) The erasing condition 202 shows condition to specify confidential information to be erased.

(3) The notifying condition 203 shows where to notify a processed result when the tamper process or the tamper recovery process is done. The notifying condition 203 includes "sending instruction" to instruct whether "tamper detection notice" notifying detection of tampering is to be sent or not and a sending destination address showing a destination of sending the "tamper detection notice".

(the Tamper Resistant Policy Record 213)

Each line of the tamper resistant policy 105 is a tamper resistant policy record 213. The tamper resistant policy record 213 includes a tamper detecting condition record 201n, an erasing condition record 202n, and a notifying condition record 203n.

(1) In the tamper detecting condition record 201n, concrete values of the tamper detecting condition 201 are written.

(2) In the erasing condition record 202n, concrete values of the erasing condition 202 are written.

(3) In the notifying condition record 203n, concrete values of the notifying condition 203 are written.

It is not necessary to specify all of the tamper detecting condition record 201n through the notifying condition record 203n of the tamper resistant policy record 213. For example, it is sufficient that the tamper detecting condition record 201n and the erasing condition record 202n (record to identify confidential information to be erased) are specified and the notifying condition 203 is not specified. Here, when at least the tamper detecting condition record 201n and the erasing condition record 202n are specified in the tamper resistant policy record 213 (an example of a sensor related record), if a sensor shown by the tamper detecting condition record 201n detects a value that satisfies the measured value condition, the confidential information erasing unit 120 erases confidential information shown by the erasing condition record 202n. Further, it is sufficient that only the erasing condition record 202n is specified. In this case, the confidential information identified by the erasing condition record 202n would not be a target for erasure regardless of detection by the sensor. Further, confidential information which is not specified by any of the erasing condition record 202n included in plural tamper resistant policy records 213 would not be a target for erasure regardless of detection by the sensor.

(the Tamper Detecting Condition Record 201n)

The tamper detecting condition record 201n is formed by plural sets of a target sensor 204 for uniquely identifying the internal sensor 109 or the external sensor 110 and a measured value condition 205 showing a range of measured values based on which it is determined that a tampering is detected.

(the Erasing Condition Record 202n)

The erasing condition record 202n is information to identify confidential information to be erased when the condition of the tamper detecting condition record 201n is satisfied. The erasing condition record 202n identifies confidential information to be erased by specifying the items of the confidential information 701 shown in FIG. 4. The erasing condition record 202n is formed by a saving place 206, a data type condition 207, a generator condition 208, and a data attribute condition 209.

(1) The saving place 206 is information showing where data of a target for erasure is saved when the data memory unit 107 is configured by plural IC chips or one IC chip which is logically divided, and so on.
(2) The data type condition 207 is information to specify type information when the type information is appended to the data. For example, in case of the tamper resistant cipher apparatus, data type such as "private key", "secret key", etc. is specified as the data type condition 207.
(3) The generator condition 208 is information to identify a program or a user that generates confidential information. For example, programs such as "data processing unit 117", "application 118", "OS at host's side", etc., or information to identify a person who performs the operation such as "user A", "user B", etc. are specified.
(4) The data attribute condition 209 is information to identify confidential information conditions other than by the saving place 206, the data type condition 207, and the generator condition 208 appended to the data. For example, it is possible to specify attribute such as a unique ID 702 and identification information appended to the confidential information, a degree of importance such as "strictly confidential", etc., purpose of use information such as "for signing the document", etc.

(the Notifying Condition Record 203n)

The notifying condition 203n is information to specify sending condition of "tamper detection notice" or "tamper recovery notice".

(1) In notifying destination condition 210 (an example of sending destination address), information to identify a notifying destination such as the data processing unit 117 or the application 118 are written.
(2) Notice type 211 (sending specification) is information to specify whether to send one or both of the tamper detection notice and the tamper recovery notice. "Not to send" can be also specified. Or even if the tamper detecting condition 201 is satisfied, it is possible to set to send only the tamper detection notice without erasing confidential information. For example, to the tamper resistant policy record 213, "erasing specification" to specify whether to erase or not to erase the confidential information is further added. Then, even if the tamper detecting condition record 201n is satisfied, the confidential information erasing unit 120 erases confidential information shown by the erasing condition record 202n from the data memory unit 107 only if "erasing specification" shown by the tamper resistant policy record 213 specifies erasure of the confidential information.
(3) The continuing condition 212 is information showing whether to notify only once or to notify continuously periodically.

FIG. 6 is a flowchart showing a procedure to set the tamper resistant policy 105. With reference to FIG. 6, the operation of the procedure to set the tamper resistant policy 105 will be explained.

First, at S301, the application 118 secures a communication channel with the tamper resistant apparatus 101 and carries out a login process according to an authentication method prescribed by the tamper resistant apparatus 101 implemented as, for example, an IC card.

Next, at S302, the application 118 sends a tamper resistant policy correcting request 501, which will be discussed later, or a tamper resistant policy setting request 601, which will be discussed later, as input data to a policy setting unit 104. The policy setting unit 104 receives the tamper resistant policy correcting request 501 or the tamper resistant policy setting request 601.

(the Tamper Resistant Policy Correcting Request 501)

FIG. 7 shows the tamper resistant policy correcting request 501 (an example of correction data; an example of a new sensor related record). The tamper resistant policy correcting request 501 is a request to change a part of the tamper resistant policy 105 which has been already set. The data structure is as shown in FIG. 7.

(1) A correction type 502 shows contents of the operation for the tamper resistant policy record 213 which is structural element of the tamper resistant policy 105 such as "erasure", "change", "addition", etc.
(2) A correction target condition 503 shows a record number, the targeted sensor 204, and the measured value condition 205 which are conditions to specify the tamper resistant policy record 213 that is a target for correction.
(3) Correction contents 504 show contents of the tamper resistant policy record 213 after addition or change is done.
(4) The correction target condition 503 and the correction contents 504 are stored according to the correction type 502 and may include no information.

(the Tamper Resistant Policy Setting Request 601)

FIG. 8 shows a tamper resistant policy setting request 601. The tamper resistant policy setting request 601 is a request to replace the whole tamper resistant policy 105 which has been set. As shown in FIG. 8, the tamper resistant policy setting request 601 includes the new tamper resistant policy 105.

Next, at S303 and S304, if the tamper resistant policy setting request 601 is received at S302, the policy setting unit 104 overwrites to replace the tamper resistant policy 105 which has been stored in the policy memory unit 106 with the tamper resistant policy 105 extracted from the tamper resistant policy setting request 601. If the tamper resistant policy correcting request 501 is received, the policy setting unit 104 extracts the tamper resistant policy record 213 which matches the correction target condition 503 from the tamper resistant policy 105 written in the policy memory unit 106, and carries out processes such as addition, change, erasure, etc. which can be identified by the correction type 502 based on the information written in the correction contents 504.

Finally, at S305, the application 118 releases the communication channel established at S301 and terminates the process.

With the above procedure, the application 118 can set the tamper resistant policy 105 in the tamper resistant apparatus 101.

Next, with reference to FIG. 9, a procedure will be explained, in which when an attacker tries to disassemble the tamper resistant apparatus 101, the tamper resistant apparatus 101 detects a tampering and erases the confidential information.

First, at S401, the tamper detecting unit 111 reads the tamper resistant policy 105 from the policy memory unit 106 and extracts all of the tamper detecting condition record 201n.

Next, at S402, the tamper detecting unit 111 reads measured values of the internal sensor 109 and the external sensor 110. Then, the tamper detecting unit 111 extracts the tamper detecting condition record 201n for which condition is established out of all the tamper detecting condition records 201n which have been read. Namely, when the measured values (detection signals) of the internal sensor 109 and the external sensor 110 are read, the tamper detecting unit 111 detects (extracts) the tamper resistant policy record 213 for which all of the tamper detecting condition record 201n (detecting condition) are satisfied based on the inputted measured values.

Next, at S403, the tamper detecting unit 111 extracts the erasing condition record 202n and the notifying condition record 203n out of the tamper resistant policy record 213 including the tamper detecting condition record 201n for which the establishment of the condition has been detected at S402. Then, the tamper detecting unit 111 analyzes the erasing condition record 202n to determine the condition for the confidential information to be erased and analyzes the notifying condition record 203n to determine the condition for a notifying destination program.

Next, at S404, the tamper detecting unit 111 determines whether to erase the confidential information or not from the analyzed result of the erasing condition record 202n at S403. If the erasure should be done, the process proceeds to S405, and proceeds to S409 if the erasure is not carried out.

Next, at S405, the tamper detecting unit 111 determines whether full erasure by disconnection of electric source is possible or not, or determines whether erasure should be done partially by program. If full erasure can be done by disconnection of electric source, the process proceeds to S408, and if the operation requires erasure by program, the process proceeds to S406.

Next, at S406, if it is determined that partial erasure should be done by program at S405, the tamper detecting unit 111 identifies all confidential information to be erased from the data memory unit 107 based on the condition for confidential information to be erased decided at S403, and issues an instruction to erase to the data erasing unit 112.

Next, at S407, the data erasing unit 112, the data memory unit 107 identifies in the data memory unit 107 the confidential information specified by the tamper detecting unit 111 at S406 and erases all of the confidential information identified. Then, the process proceeds to S409.

Next, at S408, if it is determined at S405 that full erasure should be done by disconnection of electric source, the tamper detecting unit 111 requests the power source controlling unit 113 to disconnect electric source and suspends the electric power supply to the data memory unit 107. If the data memory unit 107 is a volatile memory, the confidential information stored therein is automatically erased by disconnecting the electric source.

Next, at S409, the tamper detecting unit 111 determines whether there exists or not a program to send "tamper detecting notice" from the condition of the notifying destination program which is the analyzed result of the notifying condition record 203n at S403. If there exists, the tamper detecting unit 111 proceeds to S410 after sending notifying instruction to the tamper notifying unit 116; and if there does not, the process terminates.

Next, at S410, the tamper notifying unit 116 checks if the data processing unit 117 corresponding to the notifying instruction received from the tamper detecting unit 111 at S409 works on the CPU 103 or not, and sends the tamper detecting notice to all of the data processing units 117. When the notifying instruction to continuously notify is received, the tamper notifying unit 116 stores the notifying destination and sends continuously the tamper detecting notice.

Next, at S411, if the notifying instruction received from the tamper detecting unit 111 at S409 is the instruction to send the tamper detecting notice to the application 118, the tamper notifying unit 116 sends the tamper detecting notice to all of the pertinent programs such as the application 118, the OS, etc. which work on the host PC according to the notifying instruction. When the notifying instruction to continuously notify is received from the tamper detecting unit 111, the tamper notifying unit 116 stores the notifying destination and sends continuously the tamper detecting notice.

In the above first embodiment, the tamper resistant apparatus 101 has been explained as an apparatus; however, the operation of the tamper resistant apparatus 101 can be grasped as an erasure program of confidential information to be implemented by the computer with considering the operation of each unit of the tamper resistant apparatus 101 as a process. Further, a series of operation of each unit of the tamper resistant apparatus 101 can be also grasped as an erasure method of confidential information.

As discussed above, to the tamper detecting unit 111, not only the internal sensor 109, but also an external sensor can be connected for detecting change of environment in which the tamper resistant apparatus 101 is provided such as a switch to detect opening/closing of the cover of the PC to which the tamper resistant apparatus 101 is mounted and a GPS which can measure the setting position of the PC to which the tamper resistant apparatus 101 is mounted. Therefore, the tamper resistant apparatus 101 detects tampering activity such as removal of not only the cover of the tamper resistant apparatus 101 itself but the cover of the external apparatus such as the PC to which the tamper resistant apparatus 101 itself is connected, and carries out the tamper process. Consequently, it is possible to prevent leakage of the confidential information in the tamper resistant apparatus 101 or the data sent to the external apparatus such as the PC.

Further, in the tamper resistant policy 105, plural conditions of measured values of the internal sensor 109 and the external sensor 110 can be set as the determination conditions of tamper detection. Then, tamper detection is determined using plural measurement conditions. Accordingly, in addition to detecting tampering from reaction of a single sensor, some of sensors can be invalidated or detection of tampering can be done by a combination of plural sensors. Therefore, it is possible to make a tamper resistant level flexibly changeable according to the requirement of security demanded by a system in use.

Further, in the tamper resistant policy 105, the erasing condition 202 to specify confidential information to be erased is specified for each tamper detecting condition 201 which is condition of determining tamper occurrence. Accordingly, the confidential information to be erased can be changed according to the sensor for detecting tampering. Therefore, it is possible to make a tamper resistant level flexibly changeable according to the requirement of security demanded by a system in use, for example, if the external sensor 110 detects tampering, only the confidential information whose confidentiality is extremely high should be erased, or if the internal sensor 109 detects tampering, the confidential information for maintenance should be saved without erasing.

Further, in the tamper resistant policy 105, it is possible to specify whether to send or not tamper detecting notice to the data processing unit 117 and the application 118 when the tampering occurs. Then, the tamper notifying unit 116 sends the tamper detecting notice. Accordingly, the data processing unit 117 and the application 118 can be notified that the tampering is detected immediately. Therefore, it becomes possible to refuse to receive a processing using the confidential information or to erase the data which has been generated before (prior to the notice). Consequently, it is possible to reduce a risk of leakage of data existing in the host PC such as contents, etc. decrypted using the confidential information.

Further, the tamper resistant policy 105 stored in the policy memory unit 106 can be set via the policy setting unit 104 which operates on the CPU 103, so that other than the tamper resistant policy 105 which has been set at the time of shipping of the board (in case that the tamper resistant apparatus 101 is implemented as a board), a system administrator who uses the board can flexibly change a tamper resistant level according to the requirement of security demanded by a system in use.

Here, FIG. 3 shows a case in which one data processing unit 117 operates on the CPU 103. However, the data processing unit 117 is not limited to be formed by one program, but can be formed by plural programs. Further, plural data processing units 117 having different purposes can co-exist.

Further, although the data memory unit 107 is the volatile memory; however, without limitation to that, the data memory unit 107 can be a nonvolatile memory. However, in case of the nonvolatile memory, since data cannot be erased only by disconnecting electric source, it is necessary to select an appropriate full erasure method according to a type of memories to be used such as connecting a magnetic field generating device instead of the power source controlling unit 113 in case of the magnetic memory and connecting a memory destructive device with high voltage in case of the semi-conductor memory.

Further, although plural internal sensors 109 are connected to the tamper detecting unit 111, the internal sensor 109 does not always need to be used when there is very little risk to remove the cover such as a case using a mold cover, etc. made of epoxy resin which is extremely hard to remove.

Further, although FIG. 9 shows the operation of tamper detection, the operation of tamper recovery is the same. In this case, the confidential information erasing unit 120 observes the detection signal of the sensor which triggered sending of the tamper detecting notice. As a result of observation, if all detection signals of the triggered sensor do not satisfy the corresponding tamper detecting record (detecting condition), the tamper recovery notice to notify that the attack has ceased is sent to the sending destination to which the tamper detecting notice has been sent.

EXPLANATION OF SIGNS

Figure 1:
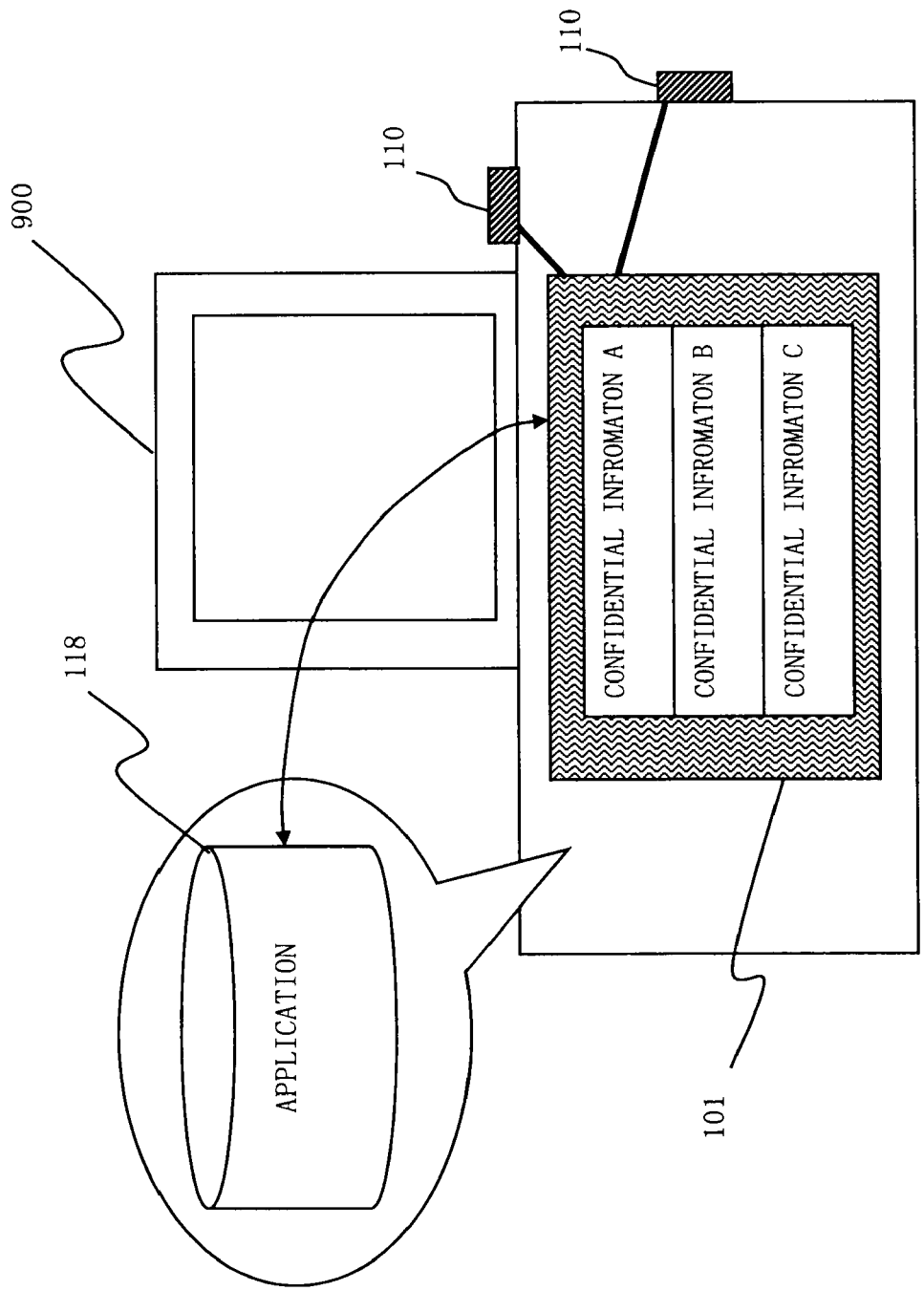
FIG. 1 shows a use status of a tamper resistant apparatus 101 according to the first embodiment.
Figure 2:
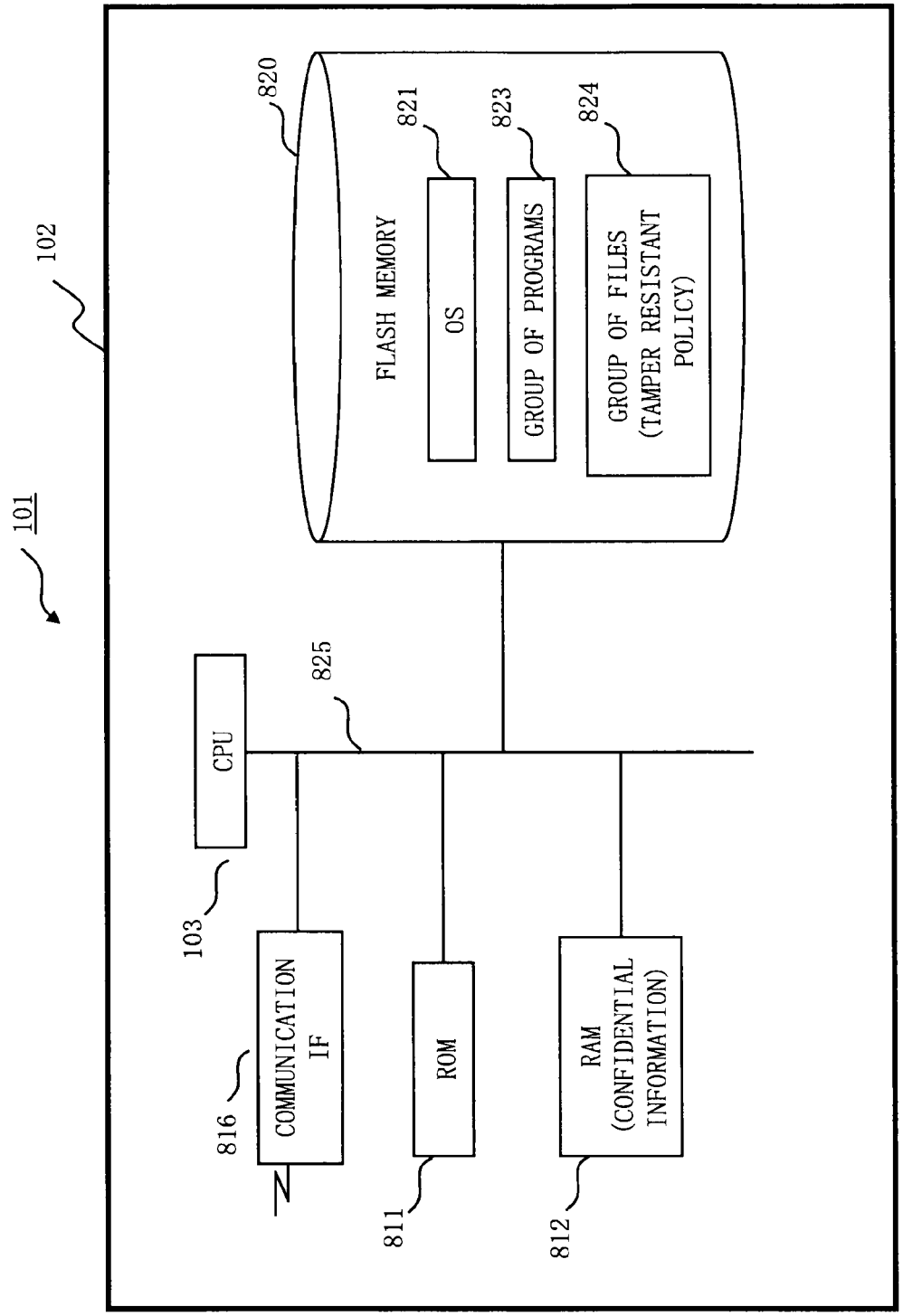
FIG. 2 shows an example of hardware configuration of the tamper resistant apparatus 101 according to the first embodiment.
Figure 3:
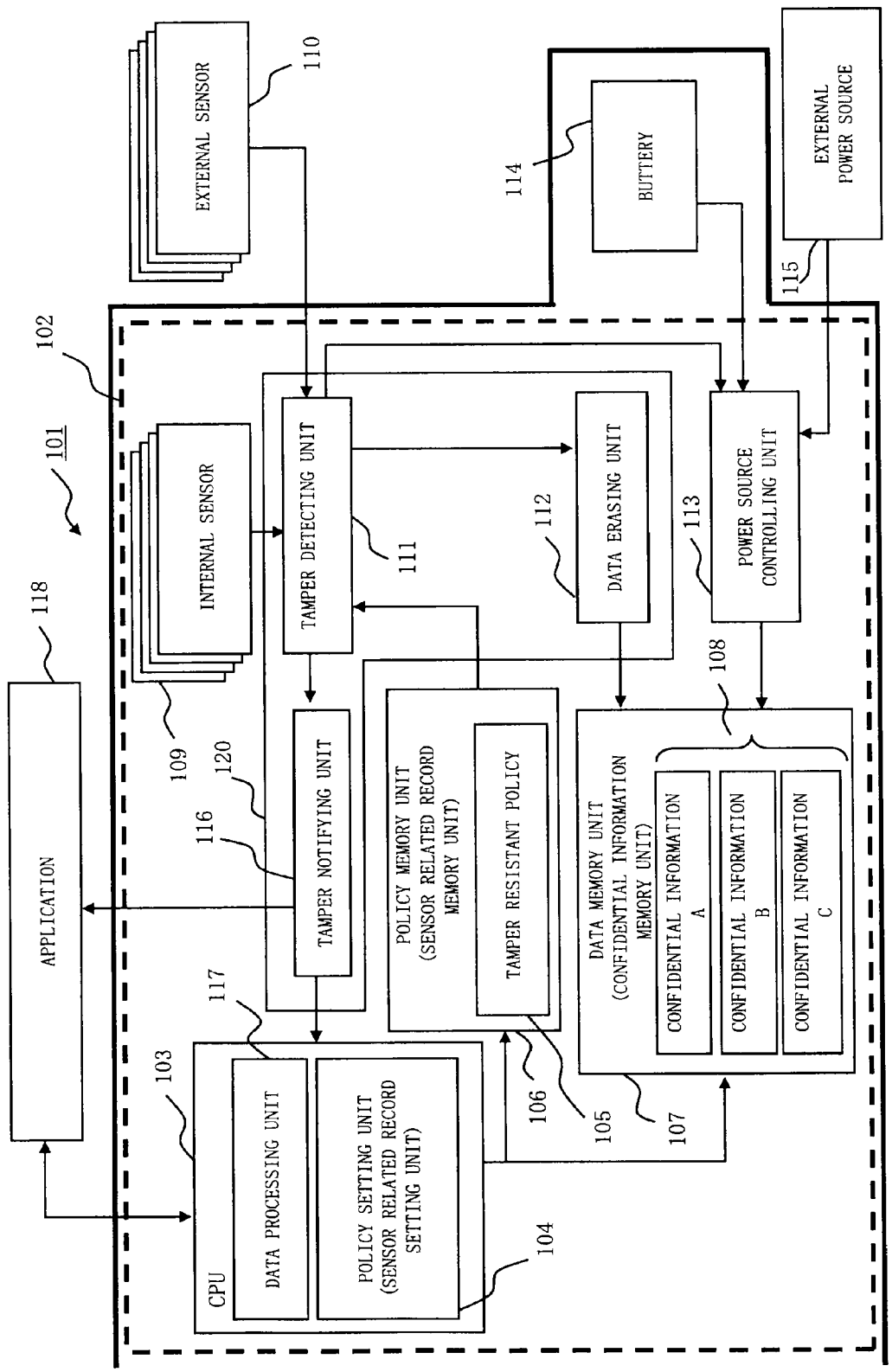
FIG. 3 shows a block configuration of the tamper resistant apparatus 101 according to the first embodiment.
Figure 4:
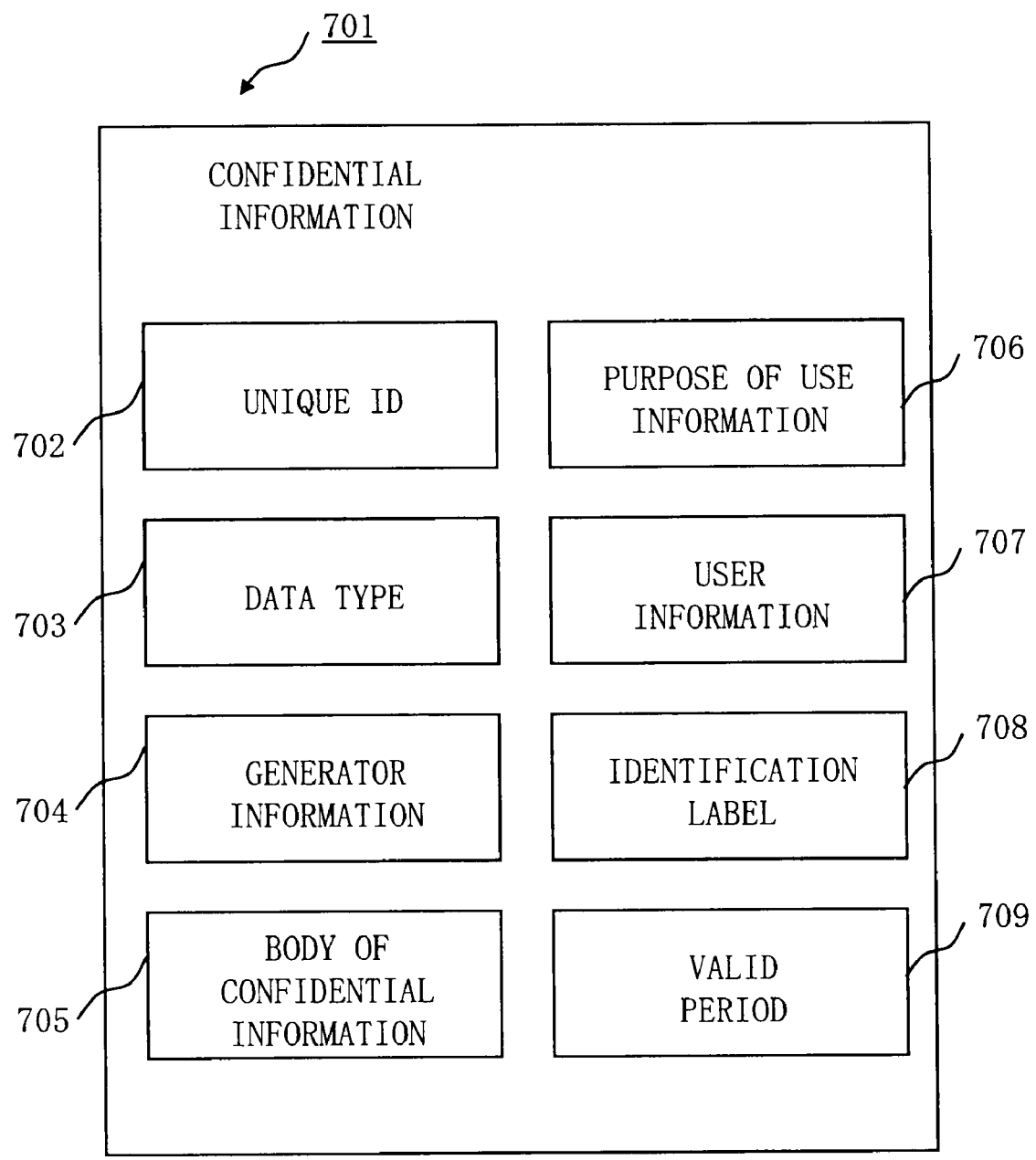
FIG. 4 shows an example of confidential information 701 according to the first embodiment.
Figure 5:
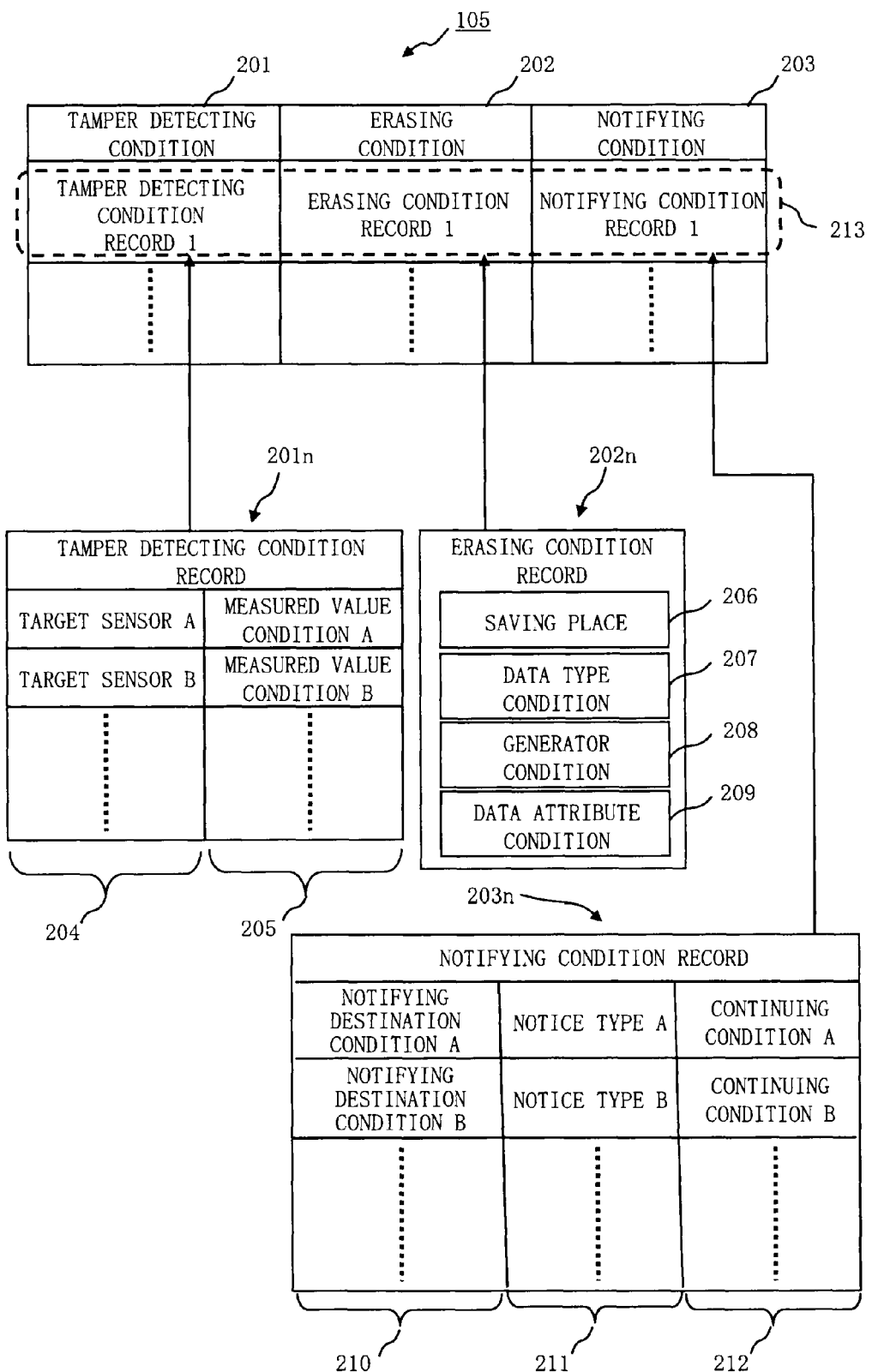
FIG. 5 shows an example of a tamper resistant policy 105 according to the first embodiment.
Figure 6:
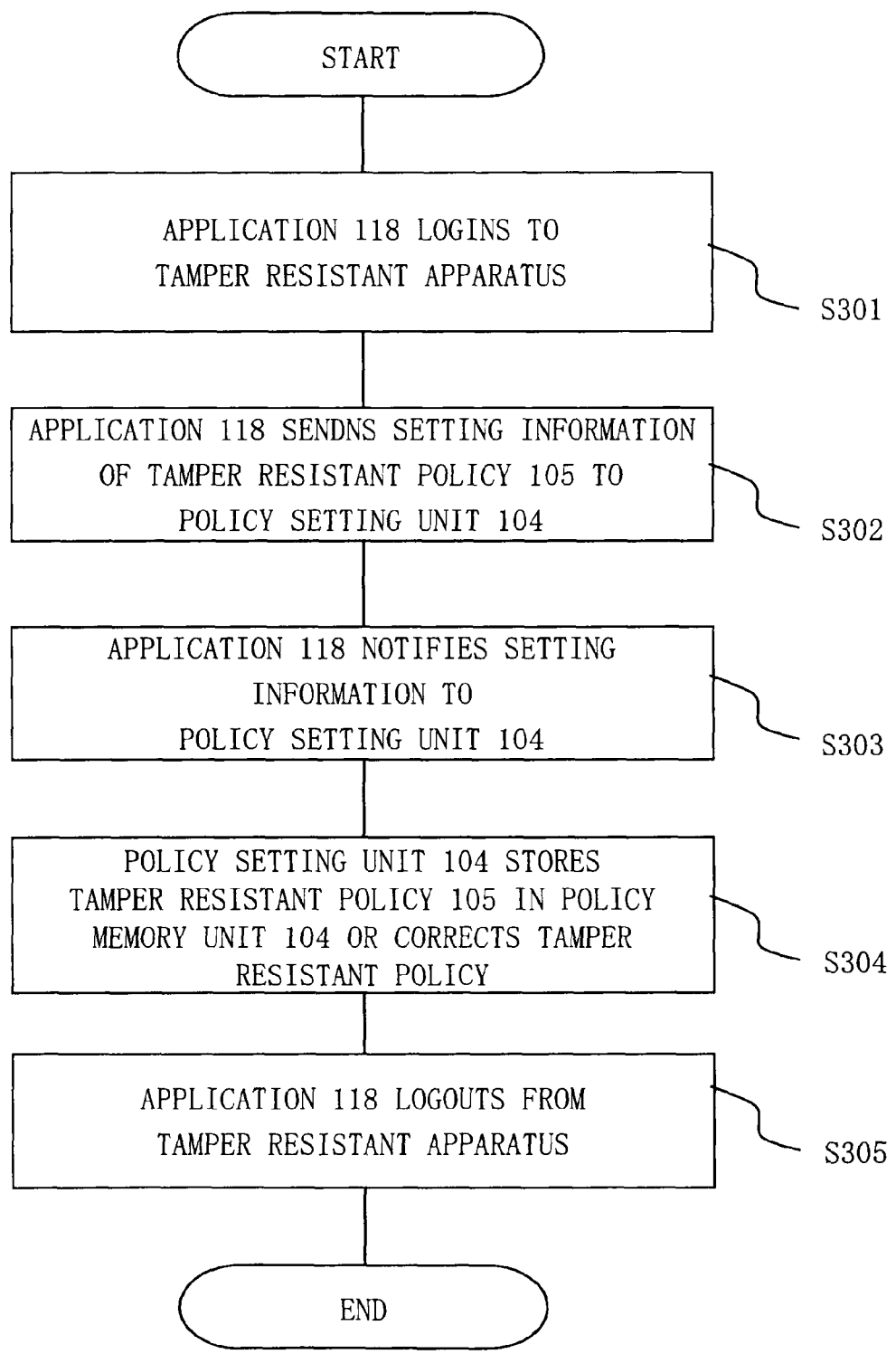
FIG. 6 shows a flowchart for setting the tamper resistant policy 105 according to the first embodiment.
Figure 7:
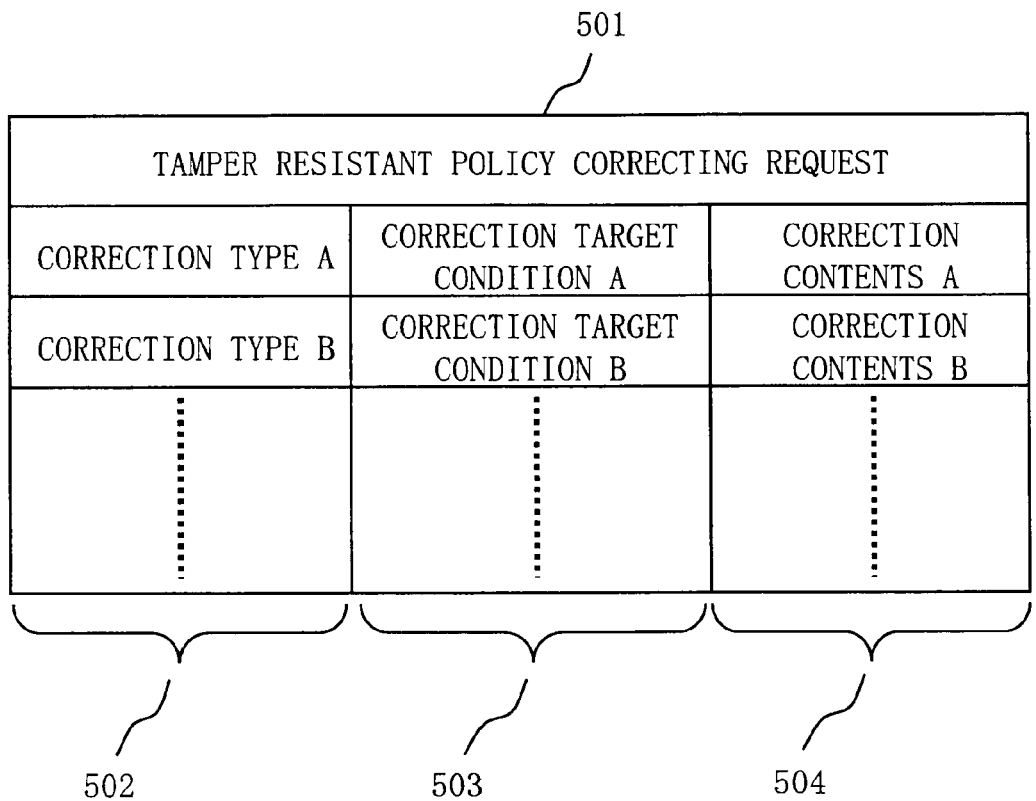
FIG. 7 shows an example of a tamper resistant policy correcting request 501 according to the first embodiment.
Figure 8:
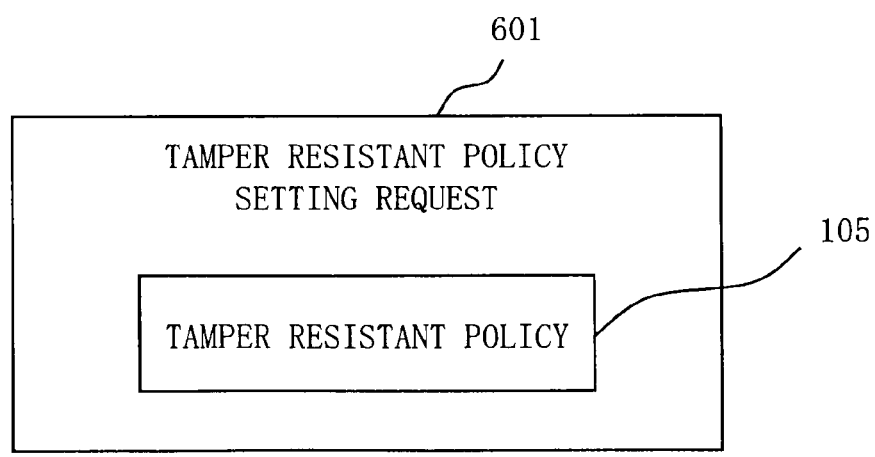
FIG. 8 shows an example of a tamper resistant policy setting request 601 according to the first embodiment.
Figure 9:
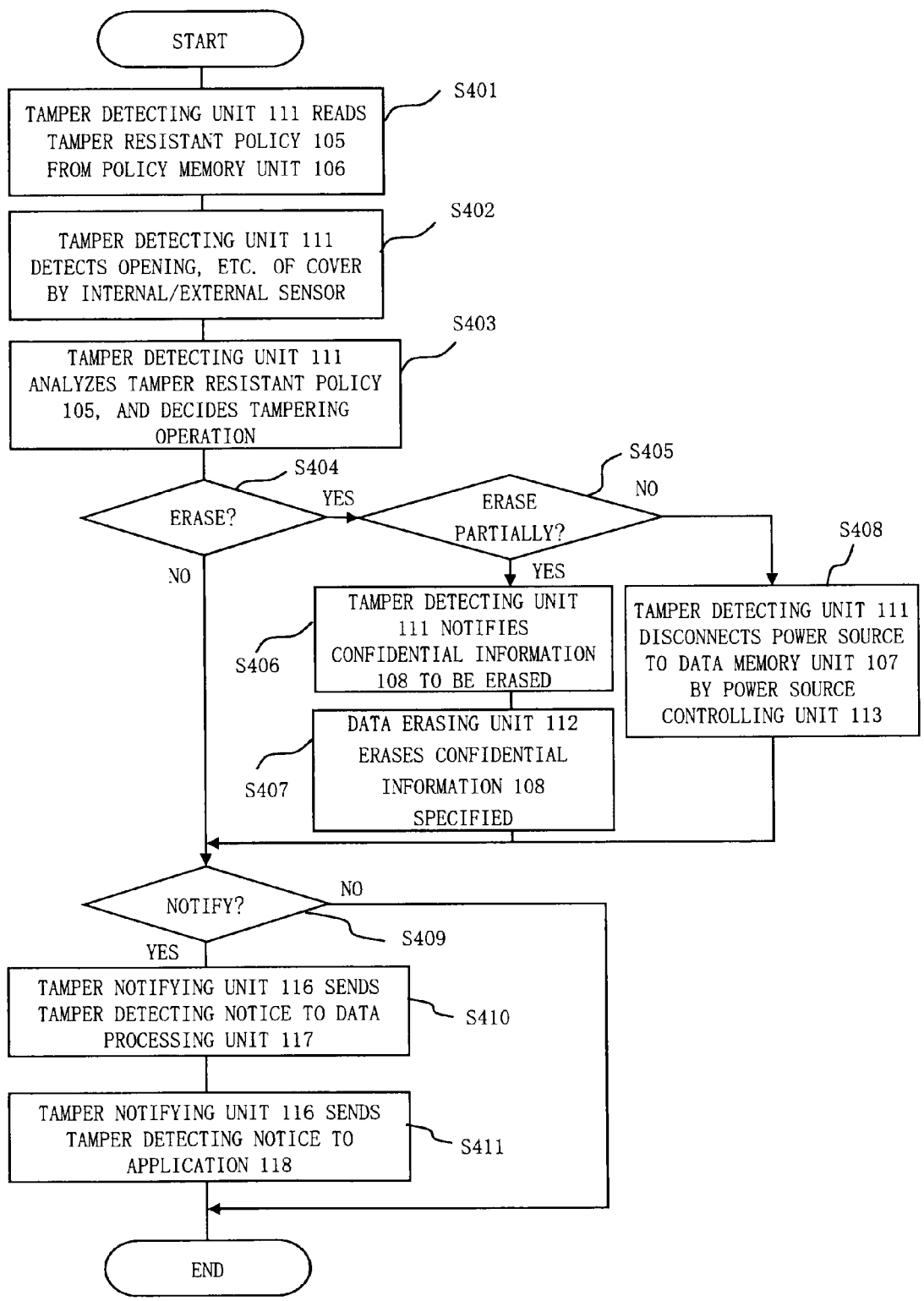
FIG. 9 shows a flowchart of tamper detection according to the first embodiment.

101: a tamper resistant apparatus; 102: a cover; 103: a CPU; 104: a policy setting unit; 105: a tamper resistant policy; 106: a policy memory unit; 107: a data memory unit; 108: confidential information; 109: an internal sensor; 110: an external sensor; 111: a tamper detecting unit; 112: a data erasing unit; 113: a power source controlling unit; 114: a buttery; 115: external power source; 116: a tamper notifying unit; 117: a data processing unit; 118: an application; 120: a confidential information erasing unit; 201: a tamper detecting condition; 202: an erasing condition; 203: a notifying condition; 201n: a tamper detecting condition record; 202n: an erasing condition record; 203n: notifying condition record; 204: a target sensor; 205: a measured value condition; 206: a saving place; 207: a data type condition; 208: a generator condition; 209: a data attribute condition; 210: a notifying destination condition; 211: a notice type; 212: a continuing condition; 213: a tamper resistant policy record; 501: a tamper resistant policy correcting request; 502: a correction type; 503: a correction target condition; 504: correction contents; 601: a tamper resistant policy setting request; 701: confidential information; 702: a unique ID; 703: a data type; 704: generator information; 705: a body of confidential information; 706: purpose of use information; 707: user information; 708: identification label; 709: a valid period; 810: a CPU; 816: a communication IF; 811: a ROM; 812: a RAM; 825: a bus; 820: a flash memory; 821: an OS; 823: a group of programs; 824: a group of files; and 900: a PC.

The invention claimed is:

1. A confidential information memory apparatus, comprising:
   a sensor related record memory for storing a plurality of sensor related records, in each of which at least one sensor is made related to confidential information specified as an erasing target and a detecting condition to be satisfied by the at least one sensor is specified, including at least two sensor related records of which the confidential information specified as the erasing target are different with each other;
   a confidential information memory for storing a plurality of pieces of confidential information; and
   a processing unit for inputting a detection signal from a sensor shown by the sensor related records stored in the sensor related record memory, extracting a sensor related record which satisfies all of the detecting conditions based on the detection signal inputted, and selectively erasing the confidential information specified as the erasing target shown by the sensor related record extracted from the plurality of pieces of confidential information stored in the confidential information memory.

2. The confidential information memory apparatus of claim 1, wherein the sensor related record includes a sending instruction to instruct whether a tamper detecting notice to notify detection of tampering should be sent or not and a sending destination address showing a sending destination of the tamper detecting notice; and wherein the processing unit, when the sensor related record which satisfies all of the detecting conditions is extracted based on the detection signal inputted, confirms the sending instruction shown by the sensor related record extracted, and if the sending instruction instructs sending, sends the tamper detecting notice to the sending destination address.

3. The confidential information memory apparatus of claim 2, wherein the sensor related record includes an erasing instruction to instruct whether confidential information shown by the sensor related record itself is erased or not; and
the processing unit, when the sensor related record which satisfies all of the detecting conditions is extracted based on the detection signal inputted, erases the confidential information shown by the sensor related record extracted from the confidential information memory only if the erasing instruction shown by the sensor related record extracted instructs erasing of confidential information.

4. The confidential information memory apparatus of claim 2, wherein the processing unit observes a detection signal which triggered sending of a tamper detecting notice, and as a result of observation, if all of the detection signals do not satisfy corresponding detecting conditions, sends a tamper-recovery notice to notify that an attack has ceased to the sending destination to which the tamper detecting notice has been sent.

5. The confidential information memory apparatus of claim 1, wherein the processing unit inputs at least either of a new sensor related record and correction data to be used for correcting the sensor related record stored in the sensor related record memory as input data, and setting the input data inputted in the sensor related record memory.

6. The confidential information memory apparatus of claim 1, wherein the confidential information memory apparatus is packed with a package; and
the sensor by which the processing unit inputs the detection signal is at least either of an external sensor provided outside of the package and an internal sensor provided inside of the package.

7. An erasing method of confidential information carried out by a confidential information memory apparatus storing confidential information, the method comprising:
by a sensor related record memory,
storing a plurality of sensor related records, in each of which at least one sensor is made related to confidential information specified as an erasing target and a detecting condition to be satisfied by the at least one sensor is specified, including at least two sensor related records of which the confidential information specified as the erasing target are different with each other;
by a confidential information memory,
storing a plurality of pieces of confidential information; and
by a processing unit,
inputting a detection signal from a sensor shown by the sensor related records stored in the sensor related record memory,
extracting a sensor related record which satisfies all of the detecting conditions based on the detection signal inputted, and
selectively erasing the confidential information specified as the erasing target shown by the sensor related record extracted from the plurality of pieces of confidential information stored in the confidential information memory.

8. A non-transitory computer-readable storage medium encoded with an erasing program of confidential information to have a confidential information memory apparatus being a computer including a confidential information memory and a sensor related record memory perform a method comprising:
storing a plurality of sensor related records, in each of which at least one sensor is made related to confidential information specified as an erasing target and a detecting condition to be satisfied by the at least one sensor is specified, including at least two sensor related records of which the confidential information specified as the erasing target are different with each other in the sensor related record memory;
storing a plurality of pieces of confidential information in a confidential information memory; and
inputting a detection signal from a sensor shown by the sensor related records stored in the sensor related record memory, extracting a sensor related record which satisfies all of the detecting conditions based on the detection signal inputted, and selectively erasing the confidential information specified as the erasing target shown by the sensor related record extracted from the plurality of pieces of confidential information stored in the confidential information memory.

* * * * *